United States Patent [19]

Mass et al.

[11] Patent Number: 5,665,434
[45] Date of Patent: Sep. 9, 1997

[54] PROCESSES FOR COATING MOLDED PLASTIC SUBSTRATES WITH AQUEOUS COATING COMPOSITIONS

[75] Inventors: Manfred Mass; Herrmann Kerber; Helga Stegen, all of Wuppertal, Germany

[73] Assignee: Herberts Gesellschaft mit Beschrankter Haftung, Wuppertal, Germany

[21] Appl. No.: 785,697

[22] Filed: Jan. 17, 1997

Related U.S. Application Data

[63] Continuation of Ser. No. 671,823, Jun. 14, 1996, abandoned, which is a continuation of Ser. No. 361,507, Dec. 22, 1994, abandoned.

[30] Foreign Application Priority Data

Dec. 23, 1993 [DE] Germany .................. 43 44 028.2

[51] Int. Cl.$^6$ .................................................. B32B 25/12
[52] U.S. Cl. ............... 427/393.5; 524/839; 524/840; 525/123; 525/124; 525/131
[58] Field of Search ............... 427/393.5; 524/839, 524/840; 525/123, 124, 131

[56] References Cited

U.S. PATENT DOCUMENTS

| | | | |
|---|---|---|---|
| 5,021,502 | 6/1991 | Patzschke et al. | 524/591 |
| 5,342,882 | 8/1994 | Gobel et al. | 524/839 |
| 5,424,369 | 6/1995 | Yukawa et al. | 525/303 |
| 5,459,197 | 10/1995 | Schwindt et al. | 524/839 |

*Primary Examiner*—Mark D. Sweet
*Attorney, Agent, or Firm*—Schweitzer Cornman Gross & Bondell LLP

[57] ABSTRACT

Aqueous coating composition based on polyols with ammonium groups and polyisocyanates, which coating composition may contain pigments and/or extenders, customary lacquer additives and one or more organic solvents, and contains A) as binder at least one (meth)acrylic copolymer with a hydroxyl value of 20 to 150 mg KOH/g and with an amine value of 10 to 150 mg KOH/g, both values being related to solid resin, wherein 2 to 50 wt.% of the solid binder resin may be replaced with one or more other binders, wherein the (meth)acrylic copolymer is neutralised with an acid containing at least one isocyanate-reactive group; and B) as crosslinking agent at least one polyisocyanate, which may be blocked, wherein components A) and B) are present in quantities such that the ratio of the sum of isocyanate-reactive groups in the binder component A) to the blocked and unblocked isocyanates in component B) is 1:0.5 to 1:3. The coating composition is in particular suitable for use in the production of coatings on plastic substrates.

7 Claims, No Drawings

PROCESSES FOR COATING MOLDED PLASTIC SUBSTRATES WITH AQUEOUS COATING COMPOSITIONS

This application is a continuing application of U.S. Ser. No. 08/671,823; filed Jun. 14, 1996 which is a continuation of U.S. Ser. No. 08/361,507, filed Dec. 22, 1994 both now abandoned.

BACKGROUND OF THE INVENTION

This invention relates to coating compositions based on acid-neutralised amine- functional (meth)acrylic copolymers (the term "(meth)acrylic" here and below means "methacrylic and/or acrylic"), which are in particular suitable for lacier coating plastic components used in automotive construction.

DE-A-41 15 588 describes a process for priming plastic substrates using a solvent-based coating composition. The binder of this coating composition is based upon a (meth)acrylic copolymer crosslinked with epoxy resin or polyisocyanate, which copolymer may optionally contain tertiary amine groups. A disadvantage of this coating composition is that it contains an organic solvent.

Aqueous, two-component coating compositions based on hydroxy-functional amine-neutralised (meth)acrylic copolymers, which are crosslinked with polyisocyanate, are for example described in DE-A-38 29 587. These coating compositions are in need of improvement in terms of their adhesion characteristics, in particular to plastic substrates.

The as yet unpublished German patent application P 43 17 791 describes aqueous, two-component coating compositions based on oligomeric or polymeric polyols with the most varied binders and special hydrophobised polyisocyanate crosslinking agents. The polyols may have an acid value or an amine value. Acetic acid and formic acid are stated as the neutralising agents for amine-functionalised polyols. These coating compositions are preferably used as a water-based clear lacquer. They are in need of improvement in terms of their adhesion to plastic components.

The as yet unpublished German patent application P 42 29 982 describes aqueous, two-component coating compositions suitable for lacquer coating plastics, which compositions are based on cationically or preferably anionically stabilised polyols as the binder and which are crosslinked with polyisocyanate. No statement is made here as to the nature of the neutralising agent used. The coating compositions must contain chlorinated polyolefin as coupling agent and are distinguished by a relatively high content of 5 to 40 wt.% of aromatic solvent. Lacquer coating stressed plastic mouldings with coating compositions having an elevated content of aggressive solvents, such as for example aromatics, is problematic as it may lead to destruction of the plastic component.

DE-A-42 03 510 describes aqueous coating compositions prepared from a combination of a) a polyol component dissolved or dispersed in water, which may be present together with a reactive diluent, and b) a polyisocyanate component emulsified therein. Component a) here has chemically incorporated ammonium groups. These coating compositions are intended to have a long pot life.

SUMMARY OF THE INVENTION

The object of the invention is to provide an aqueous, isocyanate-curing coating composition which in particular possesses improved adhesion to plastic substrates and to optionally subsequent lacquer coats.

DETAILED DESCRIPTION OF THE INVENTION

It has been found that this object may be achieved by an aqueous coating composition based on polyols with ammonium groups and polyisocyanates, which coating composition may contain pigments and/or extenders, customary lacquer additives and one or more organic solvents and which is characterised in that it contains A) as binder at least one (meth)acrylic copolymer with a hydroxyl value of 20 to 150 mg KOH/g and with an amine value of 10 to 150 mg KOH/g, both values being related to solid resin, wherein 2 to 50 wt.% of the solid binder resin may be replaced with one or more other binders, wherein the (meth)acrylic copolymer is neutralised with an acid containing at least one isocyanate-reactive group; and B) as crosslinking agent at least one polyisocyanate, which may be blocked, wherein components A) and B) are present in quantities such that the ratio of the sum of isocyanate-reactive groups in the binder component A) to the blocked and unblocked isocyanate groups in component B) is 1:0.5 to 1:3.

The (meth)acrylic copolymers (A) may be produced by free-radical copolymerisation of a1) one or more hydroxy-functional, olefinically unsaturated monomers, a2) one or more amine-functional, olefinically unsaturated monomers copolymerisable with a1) and a3), and a3) one or more olefinically unsaturated monomers without a functional group and copolymerisable with a1) and a2).

Suitable hydroxy-functional, olefinically unsaturated monomers a1) are in particular hydroxyalkyl (meth)acrylates and hydroxyalkyl (meth)acrylamides with $C_2$–$C_8$ alkyl residues. Examples are hydroxyethyl (meth)acrylate, 2-hydroxypropyl (meth)acrylate, 4-hydroxybutyl (meth)acrylate, 6-hydroxyhexyl (meth)acrylate, hydroxyethyl (meth)acrylamide, hydroxypropyl (meth)acrylamide. It is moreover also possible to use the lactonised derivatives of these hydroxy(meth)acrylic compounds obtained by reaction with lactones, such as for example ε-caprolactone, lactonised derivatives of these hydroxy(meth)acrylic compounds or also the reaction products of (meth)acrylic acid with glycidyl compounds, such as for example glycidyl esters of α,α'-disubstituted monocarboxylic acids.

Suitable amine-functional, olefinically unsaturated monomers a2) are, for example, ω-mono and particularly ω-di ($C_1$–$C_4$)alkylamino ($C_1$–$C_{18}$)alkyl (meth)acrylates and (meth)acrylamides. Examples are N(N,N-diethylaminopropyl) (meth)acrylamide, N(N,N-dimethylaminopropyl) (meth)acrylamide, N(N,N-dimethylaminoethyl) (meth)acrylamide, N-methylaminopropyl (meth)acrylamide, N-ethylaminoethyl (meth)acrylamide, N,N-dimethylaminopropyl (meth)acrylate, N,N-diethylaminopropyl (meth)acrylate, N,N-dimethylaminoethyl (meth)acrylate, N,N-diethylaminoethyl (meth)acrylate, N-methylaminoethyl (meth)acrylate, N-ethylaminopropyl (meth)acrylate. Reaction products prepared by ring-opening of the oxirane group of glycidyl (meth)acrylate with mono- or di($C_1$–$C_4$) alkylamine are also suitable.

Examples of suitable comonomers a3) are vinyl monomers such as vinyl acetate, vinyl propionate, vinyl esters of α,α'-disubstituted monocarboxylic acids, styrene, vinyltoluene, ($C_1$–$C_{18}$)alkyl (meth)acrylates or (meth)

acrylamides, such as methyl, ethyl, propyl, n-butyl, isobutyl, tert.-butyl, hexyl, 2-ethylhexyl, decyl, dodecyl, stearyl, lauryl, isobornyl, cyclohexyl, trimethylcyclohexyl (meth) acrylate or (meth)acrylamide, (meth)acrylonitrile, dialkyl esters of maleic, fumaric or itaconic acid. Difunctional (meth)acrylates, such as alkanediol di(meth)acrylates, or difunctional (meth)acrylamides of the corresponding alkanediamines may, however, also be used. The (meth) acrylic copolymers should contain no polymerised monomers with anionic groups or groups which may be converted into anionic groups.

Free-radical polymerisation may be performed using customary, known processes, such as for example solution polymerisation, emulsion polymerisation, bulk polymerisation. The (meth)acrylic copolymers (A) contained in the coating composition according to the invention are preferably produced by solution polymerisation. In this process, a solvent is initially introduced into the reaction vessel, heated to the desired temperature and the monomer/initiator mixture fed in continuously within a specific time. Chain transfer agents, such as for example mercapto compounds or dimeric α-methylstyrene, may also be used. The polymerisation temperature is between 60° and 140° C., preferably between 80° and 120° C.

The solvents for solution polymerisation are organic, preferably water-miscible solvents, which may be contained as a constituent in the coating compositions according to the invention, such as for example glycol ethers, such as ethylene glycol monobutyl ether, methoxypropanol, ethoxypropanol, diethylene glycol monobutyl ether, diethylene glycol diethyl ether, dipropylene glycol dimethyl ether, glycol ether esters, such as ethylene glycol monobutyl ether acetate, methoxypropyl acetate, diethylene glycol monobutyl ether acetate.

Polymerisation may be performed in the presence of free-radical initiators, such as for example customary peroxides or azo compounds.

Example of peroxide free-radical initiators are dialkyl peroxides, such as di-tert.-butyl peroxide, dicumyl peroxide, diacyl peroxides, such as benzoyl peroxide, hydroperoxides, such as cumene hydroperoxide, tert.-butyl hydroperoxide, peresters, such as tert.-butyl perbenzoate, tert.-butyl per-2-ethylhexanoate, peroxydicarbonates, such as dicyclohexyl peroxydicarbonate, perketals, such as 1,1-bis(tert.-butytperoxy)-3,5,5-trimethylcyclohexane, ketone peroxides, such as cyclohexanone peroxide, methyl isobutyl ketone peroxide.

Examples of azo compounds preferred as free-radical initiators are 2,2'-azobis(2,4-dimethylvaleronitrile), 2,2'-azobis(2-methylbutyronitrile), azobisisobutyronitrile.

Polymerisation conditions (reaction temperature, solvent concentration, monomer feed, initiator concentration) are selected such that the (meth)acrylic copolymers (A) have weight average molecular weights ($M_w$) (determined by gel permeation chromatography with a polystyrene standard) of between 2000 and 150000.

The monomer composition of the olefinically unsaturated monomers a1), a2) and a3) is selected such that the (meth) acrylic copolymers (A) have glass transition temperatures of between −20° and +80° C., a hydroxyl value of between 20 and 150, preferably between 35 and 120 mg KOH/g and an amine value of between 10 and 150, preferably between 20 and 100 mg KOH/g, both values being related to solid resin (A).

A preferred monomer mixture consists of 0.5 to 40 wt.% of one or more (meth)acrylamides of ω-tert.-aminoalkylamines and/or of one or more (meth) acrylates of ω-tert.-amino alcohols, 5 to 40 wt.% of one or more hydroxyalkyl (meth)acrylates and/or one or more hydroxyalkyl (meth)acrylamides and 20 to 94.5 wt.% of one or more comonomers a3).

On completion of polymerisation, the resultant organic solutions of the (meth)acrylic copolymers (A) are neutralised with acids having at least one isocyanate-reactive group. To this end, the quantity of acid added is such that, for each amine equivalent in the (meth)acrylic copolymers (A), there are present 0.6 to 1.5 equivalents (degree of neutralisation 60–150%), preferably between 0.7 and 1.2 equivalents (degree of neutralisation 70–120%), of acid.

Suitable acids having at least one isocyanate-reactive group are, for example, mono- or polybasic carboxylic acids, phosphonic acids and sulphonic acids with at least one primary amine and/or secondary amine and/or hydroxy and/or mercapto group in the molecule. Examples which may be cited are aminocarboxylic acids such as glutamic acid, aspartic acid, 2-aminobutyric acid, 4-aminobutyric acid, α,δ-diaminovaleric acid, 3,4-diaminobenzoic acid; aminosulphonic acids such as 2,4-diaminotoluene-5-sulphonic acid, 4,4-diamiondiphenyl ether sulphonic acid; hydroxyphosphonic acids such as 2,2-dimethylolpropanephosphonic acid. Hydroxycarboxylic acids are preferred, such as for example lactic acid, glycolic acid, diglycolic acid, citric acid, mandelic acid, malic acid, hydroxypropionic acid, hydroxyvaleric acid, hydroxypivalic acid, 12-hydroxystearic acid, monomeric or oligomeric ring-opening products of lactones produced by hydrolysis, such as for example hydrolysed ε-caprolactone. Of the hydroxycarboxylic acids, the polyhydroxycarboxylic acids are particularly preferred, such as for example tartaric acid, dihydroxypropionic acid, dihydroxysuccinic acid, dihydroxybenzoic acid, polyhydroxycarboxylic acids obtainable by oxidation of monosaccharides, such as gluconic acid, saccharic acid, mucic acid, glucuronic acid and in particular dimethylolalkanecarboxylic acids, such as dimethylolacetic acid, dimethylolpropionic acid, dimethylolbutyric acid, dimethylolpentanoic acid.

These acids are in particular those which are reactive with the reactive groups of the isocyanate, but not predominantly with the acid function (for example the carboxyl group).

On completion of neutralisation, the aqueous binder (A) is obtained by adding portions of deionised water until a solids content of 20 to 60, preferably between 25 and 50 wt.% is achieved.

The coating compositions according to the invention may, in addition to the (meth)acrylic copolymers (A), also contain 2 to 50 wt.%, preferably between 15 and 30 wt.%, related to solid resin content, of other binders. Examples are polyesters, polyurethanes and (meth)acrylic copolymers with a composition differing from that of (A). These additional binders preferably contain isocyanate-reactive groups, such as for example hydroxyl groups, which allow chemical incorporation into the lacquer film.

The coating composition according to the invention contains as crosslinking agent (B) at least one blocked or unblocked polyisocyanate in a quantity such that there is in the finished coating composition a ratio of isocyanate-reactive groups to blocked or unblocked isocyanate groups of 1:0.5 to 1:3, preferably of 1:0.8 to 1:1.5. Isocyanate-reactive groups are taken to be the sum of the hydroxyl groups and optionally present NH groups in the (meth) acrylic copolymers (A) plus the isocyanate-reactive groups in the acid used for neutralisation, i.e. the isocyanate-reactive groups preferably comprise the sum of the hydroxyl groups from (A) plus the hydroxyl groups of a hydroxycarboxylic acid.

The polyisocyanates are customary aliphatic, cycloaliphatic, aromatic and/or araliphatic isocyanates with two or more isocyanate groups in the molecule or the reaction products thereof, in particular the dimerisation products derived from diisocyanates and containing uretdione groups or the trimerisation products containing isocyanurate groups, the biuret polyisocyanates produced by reaction of diisocyanates with water and the reaction products containing urethane groups of excess diisocyanate with polyols, such as for example trimethylolpropane. Examples of diisocyanates which may be cited are customary commercial diisocyanates such as diphenylmethane diisocyanate, tolylene diisocyanate, tetramethylxylylene diisocyanate, hexamethylene diisocyanate, isophorone diisocyanate, diisocyanatodicyclohexylmethane. Aliphatic or cycloaliphatic diisocyanates or the polyisocyanate derivatives derived therefrom are preferred, particularly if the coating compositions according to the invention are to be used to produce a topcoat or clear lacquer coat.

The use of water-thinnable or particularly water-compatible polyisocyanates as the crosslinking agent (B), as are for example described in DE-A-41 29 953 and DE-A-41 36 618, has proved particularly successful. Such water-dispersible polyisocyanates are, for example, commercially available from the company Bayer under the name Bayhydur LS 2025 and LS 2032.

The polyisocyanates in the coating compositions according to the invention may, if the coating composition according to the invention is intended to be storable for relatively extended periods, be blocked with monofunctional compounds containing active hydrogen. Selection of the blocking agent, which may be eliminated under the action of heat to reform the free isocyanate groups, is dependent upon the prevailing baking conditions on curing of the coating composition according to the invention. Examples of suitable blocking agents are lactams, such as $\epsilon$-caprolactam, oximes, such as methyl ethyl ketoxime, and monoalcohols, such as 2-ethyl hexanol and tert.-butanol; acetoacetic esters, for example methyl and ethyl acetoacetate; malonic acid diesters, for example dimethyl and diethyl malonate. Use of the coating compositions according to the invention formulated with blocked polyisocyanates is particularly suitable for lacquer coating heat resistant plastics, i.e. plastics which are dimensionally stable at the prevailing baking temperatures. The polyisocyanate crosslinking agents (B) are preferably used uncapped, i.e. the coating compositions according to the invention are preferably two-component systems.

The polyisocyanates may be incorporated by stirring or emulsifying them into the neutralised aqueous binder. It may be favorable if the polyisocyanate is pre-diluted with a water-miscible solvent. Care must be taken when diluting unblocked polyisocyanates that solvents are used which contain no active hydrogen, such as for example N-methylpyrrolidone, diethylene glycol diethyl ether, dipropylene glycol dimethyl ether, ethylene glycol monobutyl ether acetate, diethylene glycol monobutyl ether acetate, methoxypropyl acetate or other alcohols with OH groups having low reactivity, such as for example diacetone alcohol.

The coating compositions according to the invention may be pigmented or unpigmented. In the case of pigmented coating compositions, the weight ratio of pigment and/or extender to binder plus crosslinking agent (each calculated as the solid constituent) is for example 0.03:1 to 2:1, depending upon the shade of color. If the coating compositions according to the invention are used as primers, the pigment/binder ratio is between 0.3:1 and 2:1, preferably between 0.8:1 and 1.2:1.

Examples of pigments and extenders are customary coloured, coulourless or transparent, inorganic or organic pigments and extenders, such as carbon black, titanium dioxide, iron oxide pigments, silicon dioxide, barium sulphate, kaolin, talc, corrosion protection pigments, conduction pigments, organic, crosslinked microparticles, azo pigments, phthalocyanine pigments.

The coating compositions according to the invention may also contain effect pigments, particularly when formulated as base lacquer coating compositions.

The coating compositions according to the invention may be pigmented using special pigment pastes containing paste resins, but pigments and/or extenders are preferably directly ground or mixed into the neutralised binder (A). Grinding may proceed in customary Units known to the person skilled in the art, such as for example bead mills, wherein grinding is performed down to very small particle sizes in order to achieve smooth surfaces on the lacquer films produced with the coating composition according to the invention.

The coating composition according to the invention may contain up to 20 wt.% of water-miscible, organic solvents. The preferred lower limit is 1 wt.%, the content of water-miscible, organic solvent is preferably less than 15 wt.%. The solvents may, for example, be a constituent of the aqueous binder (A) produced by solution polymerisation. Examples of suitable water-miscible, organic solvents are dimethylformamide, N-methylpyrrolidone, ketones, such as acetone, methyl ethyl ketone, alcohols, such as isopropanol, butanol or the above-stated glycol ethers and glycol ether esters.

The coating compositions according to the invention may contain customary lacquer additives in the quantities customary in lacquers (for example, less than 5 wt.% each related to the finished coating composition). Examples are non water-miscible aliphatic solvents, anticratering agents, antifoaming agents, dispersion auxiliaries, wetting agents, levelling agents, thickeners, light stabilisers, stabilisers, catalysts.

In the case of the preferred application of coating plastics, the coating compositions according to the invention may be used directly without additional measures for lacquer coating relatively polar plastic substrates, such as for example polycarbonate, polyester, polyurethane, polyurea, polyamide, ABS, PVC. If the surface of particularly non-polar polyolefin plastics has been pretreated by customary methods to increase polarity, such as for example flame treatment, UV irradiation, etching with chemical agents, plasma treatment, corona treatment, the plastic surfaces may also be directly coated with the coating composition according to the invention.

When directly lacquer coating particularly non-polar plastic substrates, such as for example unpretreated polyolefin plastics, it may be convenient for the coating compositions according to the invention to contain adhesion promoters. For example, the coating composition according to the invention may contain to this end known adhesion promoters based on chlorinated polyolefins with a degree of chlorination of between 10 and 40 wt.% in a quantity of between 2 and 25 wt.%, related to the binder solids content. Incorporation into the coating composition according to the invention may proceed by emulsification or aqueous preparations of chlorinated polyolefins may be mixed in. Such water-dispersible chlorinated polyolefins are, for example, commercially available from the company Eastman-Kodak under the name CP 347 W or CP 349 W.

In ready-to-apply form, the coating compositions according to the invention have solids contents of 30 to 60, preferably of 35 to 50 wt.%. The coating compositions according to the invention are applied by rolling, dipping or preferably spraying. The dry coat thicknesses of lacquer coats produced with the coating compositions according to the invention are preferably between 5 and 80 μm. If the coating composition according to the invention is used to produce priming coats, the dry coat thicknesses are preferably between 15 and 50 μm, while greater dry coat thicknesses preferably between 20 and 60 μm are produced when topcoats or clear lacquer coats are applied. The dry coat thicknesses of base lacquer coats produced using the coating composition according to the invention are preferably between 10 and 30 μm.

Application may proceed using the wet-on-wet process, such as for example overcoating an unbaked (aqueous) base coat lacquer with a clear lacquer coating composition according to the invention and subsequently baking or drying them together at elevated temperature.

After application, the lacquer coats produced from the coating compositions according to the invention are dried or baked, wherein crosslinking occurs. In the case of the coating compositions according to the invention formulated with free polyisocyanates, this occurs at temperatures of between 20° and 120° C., preferably between 60° and 100° C., while temperatures of between 100° and 180° C., preferably between 120° and 160° C. are selected for coating compositions according to the invention formulated with blocked polyisocyanates.

The coating compositions according to the invention are suitable for coating many optionally precoated substrates, such as for example metal, wood and in particular for coating precoated or uncoated plastic components, as are for example used in automotive construction. The coating compositions according to the invention are preferably used to produce primer coats, base lacquer coats, clear lacquer coats and topcoats. The primer coats or base lacquer coats produced from the coating composition according to the invention may be provided with further lacquer coats. These coats may be of known aqueous or solvent-borne coating compositions, or appropriately formulated coating compositions according to the invention are used.

The lacquer coats produced from the coating compositions according to the invention have excellent adhesion to plastic substrates and impart marked adhesion to subsequently applied lacquer layers.

Without being attached to a single theory, it is assumed that the surprisingly good adhesion of the lacquer coats produced with the coating compositions according to the invention to plastic surfaces and further lacquer coats arises from the covalent incorporation of the neutralising acid into the lacquer film during crosslinking, associated with the formation of polarising salt groups in the lacquer film.

Production of Aqueous Binders

Example 1

220 parts of diethylene glycol dimethyl ether are introduced into a vessel and heated to 100° C. while being stirred and refluxed. A mixture of 118 parts of isobutyl acrylate, 171.5 parts of ethylhexyl acrylate, 237.5 parts of methyl methacrylate, 77.3 parts of 2-hydroxypropyl methacrylate, 134.5 parts of dimethylaminopropyl methacrylate and 8.5 parts of 2,2-azobis(2-methylbutyronitrile) are then continuously fed in within 5 hours. On completion of feeding, 2.7 parts of 2,2-azobis(2-methylbutyronitrile) and 30 parts of diethylene glycol dimethyl ether are added and the batch held at 100° C. for 5 hours. 82 parts of dimethylolpropionic acid are then added and a temperature of 100° C. maintained for a further 30 minutes. After cooling to 70° C., the mixture is diluted to a solids content of 30 wt.% with portions of deionised water.

Example 2

The same procedure is used as in example 1, with the difference that 180 parts of ε-caprolactone hydrolysed with water having an acid value of 246 mg KOH/g are used as the neutralising agent instead of the dimethylolpropionic acid.

Example 3

The same procedure is used as in example 1, with the difference that 237 parts of 12-hydroxystearic acid are used as the neutralising agent instead of the dimethylolpropionic acid.

Production of a Plastic Priming Coat

Example 4

40 parts of the aqueous binder from example 1 are combined in succession in a dissolver with 0.4 parts of a customary commercial wetting agent, 0.2 parts of a customary commercial thickener (Bentone), 0.4 parts of a customary commercial defoamer, 10 parts of titanium dioxide, 1 part of carbon black, 9 parts of barium sulphate, 1 part of ethylene glycol monobutyl ether and 28 parts of deionised water. After thorough homogenisation, the mixture is ground in a bead mill. A mixture of 3 parts of N-methylpyrrolidone and 7 parts of a customary commercial water-emulsifiable polyisocyanate based on hexamethylene diisocyanate is then thoroughly mixed in. Viscosity is adjusted to 30 seconds (DIN 4 cup) with deionised water and test sheets of polycarbonate (Xenoy CL 101 from General Electric Plastics) are sprayed to a dry coat thickness of 25 μm. After briefly flashing off, the coating is cured for 30 minutes at 80° C. A plastic primer with excellent adhesion and moisture resistance is obtained.

Production of a Single Coat Plastic Topcoat Lacquer (Contrasting Mid Grey Shade for Bodywork Trim)

Example 5

45 parts of the aqueous binder from example 1 are combined in succession in a dissolver with 0.6 parts of a customary commercial wetting agent, 0.3 parts of a customary commercial thickener (Bentone), 0.6 parts of a customary commercial defoamer, 8 parts of titanium dioxide, 0.5 parts of carbon black, 1 part of ethylene glycol monobutyl ether and 24 parts of deionised water. After thorough homogenisation, the mixture is ground in a bead mill. A mixture of 5 parts of N-methylpyrrolidone and 15 parts of the polyisocyanate from example 4 is then thoroughly mixed in.

Dilution to application viscosity and application proceed as described in example 4, with the difference that the coating is applied to a dry coat thickness of 35 μm. Curing requires 40 minutes at 80° C. A mid grey topcoat is obtained, as is customary for contrasting shades in plastic bodywork trim. Moisture and weathering resistance is good. Even without an underlying primer coat, adhesion is excellent.

Production of a Multicoat Lacquer Coating

Example 6

60 parts of the aqueous binder from example 1 are uniformly mixed with 0.5 parts of a customary commercial levelling agent, 0.5 parts of a customary commercial deframer, 1 part of a 1:1 mixture of a customary commercial HALS- and benzotriazole-based light stabiliser, 2 parts of ethylene glycol monobutyl ether and 6 parts of deionised water. A mixture of 7 parts of N-methylpyrrolidone and 23 parts of the polyisocyanate from example 4 is then mixed in and homogenised. Application viscosity is adjusted with deionised water as in example 4, but in this case to 25 seconds.

The resultant clear lacquer is sprayed wet-on-wet to a dry coat thickness of 35 µm onto a plastic test sheet provided with an uncured aqueous base lacquer (metallic silver, dry coat thickness 15 µm) which had been flashed off, and, after 3 minutes' flashing off, was cured for 40 minutes at 80° C. A multicoat lacquer coating is obtained having good moisture and weathering resistance, elevated gloss and good adhesion of the clear lacquer to the base lacquer.

We claim:

1. A method of coating plastic components including the steps of:

(i) forming a molded plastic substrate;

(ii) applying an aqueous coating composition to said substrate;

(iii) such aqueous coating composition being based on polyols with ammonium groups and polyisocyanates, which coating composition may contain pigments and/or extenders, customary lacquer additives and one or more organic solvents, characterized in that it contains:

A) as binder at least one (meth)acrylic copolymer with a hydroxyl value of 20 to 150 mg KOH/g and with an amine value of 10 to 150 mg KOH/g, both values being related to solid resin, wherein 2 to 50 wt. % of the solid binder resin may be replaced with one or more other binders, wherein the (meth)acrylic copolymer is neutralized with an acid containing at least one isocyanate-reactive group; and B) as crosslinking agent at least one polyisocyanate, which may be blocked, wherein components A) and B) are present in quantities such that the ratio of the sum of isocyanate-reactive groups in the binder component A) to the blocked and unblocked isocyanates in component B) is 1:0.5 to 1:3.

2. The method of claim 1 in which said coating composition of step (iii) is characterized in that the acid having at least one isocyanate-reactive group for neutralizing the (meth)acrylic copolymer is selected from the group consisting of mono- or polybasic carboxylic acids, phosphonic acids and sulfonic acids with at least one primary amine and/or secondary amine and/or hydroxy and/or mercapto group in the molecule.

3. The method of claim 2 in which the coating composition of step (iii) is characterized in that a hydroxycarboxylic acid, dihydroxycarboxylic acid or polyhydroxycarboxylic acid is present as the acid having at least one isocyanate-reactive group.

4. The method of claim 3 in which the coating composition of step (iii) is characterized in that the (meth)acrylic copolymer of component A) has a weight average molecular weight ($M_W$) of 2000 to 15000.

5. The method of claim 4 in which the coating composition of step (iii) is characterized in that the (meth)acrylic copolymer of component A) may be obtained by free-radical initiated polymerization of 0.5 to 40 wt. % of one or more (meth)acrylamides of -tert.-aminoalkylamines and/or one or more (meth)acrylates of -tert.-amino alcohols, 5 to 40 wt. % of one or more hydroxyalkyl (meth)acrylates and/or one or more hydroxyalkyl (meth)acrylamides and 20 to 94.5 wt. % of one or more different co-monomers.

6. The method of claim 5 in which the coating composition of step (iii) is characterized in that the acids having at least one isocyanate-reactive group are added in a quantity such that 0.6 to 1.5 equivalents of acid are present per amine equivalent in the (meth)acrylic copolymer (A).

7. The method of claim 6 in which the coating composition of step (iii) is characterized in that ocmponent A) contains as an additional binder one or more polyesters, polyurethanes and/or different (meth)acrylic copolymers.

* * * * *